(12) United States Patent
Lucarelli et al.

(10) Patent No.: US 12,172,614 B2
(45) Date of Patent: Dec. 24, 2024

(54) METHOD AND SYSTEM FOR CONTROLLING THE PNEUMATIC PRESSURE IN A VOLUME

(71) Applicant: Faiveley Transport Italia S.P.A., Turin (IT)

(72) Inventors: Stefano Lucarelli, Turin (IT); Maurizio Mittino, Turin (IT); Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 715 days.

(21) Appl. No.: 17/416,418

(22) PCT Filed: Dec. 17, 2019

(86) PCT No.: PCT/IB2019/060885
§ 371 (c)(1),
(2) Date: Jun. 18, 2021

(87) PCT Pub. No.: WO2020/128808
PCT Pub. Date: Jun. 25, 2020

(65) Prior Publication Data
US 2022/0073044 A1 Mar. 10, 2022

(30) Foreign Application Priority Data

Dec. 18, 2018 (IT) .................... 102018000020125

(51) Int. Cl.
*G05D 16/20* (2006.01)
*B60T 13/68* (2006.01)
(Continued)

(52) U.S. Cl.
CPC .......... *B60T 13/683* (2013.01); *B60T 15/027* (2013.01); *B60T 17/228* (2013.01); *G05D 16/2026* (2013.01)

(58) Field of Classification Search
CPC ....... B60T 13/68; B60T 13/683; G05D 16/20; G05D 16/2006; G05D 16/2026;
(Continued)

(56) References Cited

U.S. PATENT DOCUMENTS 6,520,601 B1 * 2/2003 Kahl .................... B60T 8/48
303/155
8,296,031 B2 * 10/2012 Park .................... B60T 8/885
701/70

(Continued)

FOREIGN PATENT DOCUMENTS

WO 2018007187 A1 1/2018

OTHER PUBLICATIONS

Intellectual Property India, Examination Report Issued in Application No. 202147031366, Feb. 23, 2022, 7 pages.
(Continued)

*Primary Examiner* — Hailey K. Do
(74) *Attorney, Agent, or Firm* — K&L Gates LLP (57) ABSTRACT

A method is described for controlling pneumatic pressure by actuating a charge and a discharge valve that vary the pressure, comprising, providing a matrix wherein each cell indicates a time for opening the charge or discharge valve; if the initial pressure value in the volume is less than the target pressure value to be reached, opening the charge valve, decreasing the value of the opening time indicated in the selected cell if the pressure value in the volume exceeds the target pressure value and possibly increasing the value of the time indicated in the selected cell; if the initial pressure value in the volume is greater than the target pressure value, opening the one discharge valve for the time indicated in a selected cell and possibly increasing the time value indicated in the selected cell and possibly decreasing the time value indicated in the selected cell.

14 Claims, 6 Drawing Sheets

(51) Int. Cl.
*B60T 15/02* (2006.01)
*B60T 17/22* (2006.01)

(58) Field of Classification Search
CPC .......... G05D 16/2033; Y10T 137/0396; Y10T 137/86992; Y10T 137/87169; Y10T 137/87193; Y10T 137/87209
See application file for complete search history.

(56) References Cited

U.S. PATENT DOCUMENTS

| | | | |
|---|---|---|---|
| 9,382,953 B2 * | 7/2016 | Kuwahara | ............... F16D 48/02 |
| 2018/0056952 A1 | 3/2018 | Ono et al. | |

OTHER PUBLICATIONS

ISA European Patent Office, International Search Report Issued in Application No. PCT/IB2019/060885, Mar. 11, 2020, WIPO, 3 pages.
ISA European Patent Office, Written Opinion of the International Searching Authority Issued in Application No. PCT/IB2019/060885, Mar. 11, 2020, WIPO, 6 pages.

* cited by examiner

METHOD AND SYSTEM FOR CONTROLLING THE PNEUMATIC PRESSURE IN A VOLUME

CROSS REFERENCE TO RELATED APPLICATIONS

The present application is a U.S. National Phase of International Application No. PCT/IB2019/060885 entitled "METHOD AND SYSTEM FOR CONTROLLING THE PNEUMATIC PRESSURE IN A VOLUME," and filed on Dec. 17, 2019. International Application No. PCT/IB2019/060885 claims priority to Italian Patent Application No. 102018000020125 filed on Dec. 18, 2018. The entire contents of each of the above-listed applications are hereby incorporated by reference for all purposes.

TECHNICAL FIELD

The present invention belongs, in general, to the field of pressure control systems and methods for pneumatic or fluid-dynamic systems. In particular, the invention concerns a method and system for controlling the pneumatic pressure in a volume by actuating at least one electropneumatic charge valve and one electropneumatic discharge valve. In particular, this method and this system are applied in the context of railway braking systems.

BACKGROUND AND SUMMARY

Figure 1:
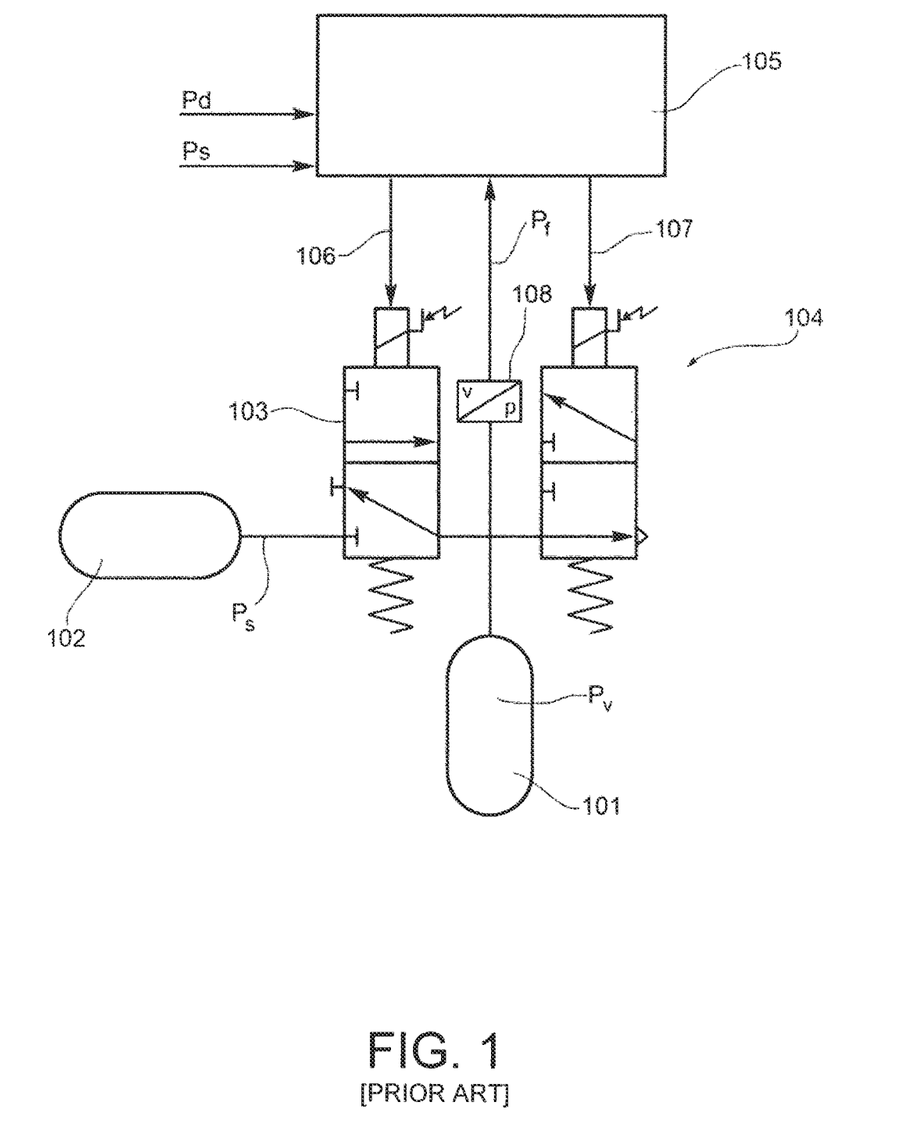
FIG. 1 illustrates a first control system of a pneumatic pressure within a volume made according to the known art.

Analyzing the circuit shown in FIG. 1, it is a typical pneumatic pressure control system within a volume 101. A source 102 delivers a gas with a supply pressure Ps to supply an electropneumatic charge valve 103 provided to allow or prevent the access of the gas in the volume 101. An electropneumatic discharge valve 104 is provided to allow or prevent the ejection of the gas from the volume 101 into the atmosphere. In such FIG. 1, the type of electropneumatic valves illustrated is such that, in the case of de-energized electropneumatic valves, the electropneumatic charge valve 103 prevents the admission of gas coming from the source 102, and the electropneumatic discharge valve 104 connects the volume 101 to the atmosphere, thus bringing the pressure in the volume 101 to the atmospheric pressure value. To increase the pressure inside the volume 101, both the electropneumatic charge valve 103 and the electropneumatic discharge valve 104 must be energized. In this case, the electropneumatic charge valve 103 allows the admission of gas coming from the source 102, thus increasing the pressure inside the volume 101, and the electropneumatic discharge valve 104 does not connect the volume 101 to the atmosphere and prevents the ejection of the gas from the volume 101 into the atmosphere.

To maintain a constant pressure value other than zero within the volume 101, the electropneumatic charge valve 103 must be de-energized, and the electropneumatic discharge valve 104 must be energized. The pressure levels reached in the volume 101 thus depend on the times in which the electropneumatic charge valve 103 and the electropneumatic charge valve 104 are energized.

Similar configurations with control logic of the valves normally closed instead of normally open and vice versa may be used.

The system illustrated in FIG. 1 is normally applied in the context of rail braking systems. In particular, the volume 101 may represent the volume of a brake cylinder, or the volume of a pilot chamber of a relay valve used to control the pressure in a brake cylinder.

Typical applications in the railroad field use typically, but not restrictively, variant supply pressures Ps between 2 bar and 10 bar.

In the following analysis, the fluid-dynamic behavior of the electropneumatic charge valve 103 and the electropneumatic discharge valve 104 is considered, comparable to the behavior of a nozzle. This assumption is made possible by the dimensional ratios between the pneumatic passages in the electropneumatic charge and discharge valves 103, 104 and the volume 101, in both cases wherein said volume 101 represents a brake cylinder or the pilot chamber of a relay valve.

Figure 2:
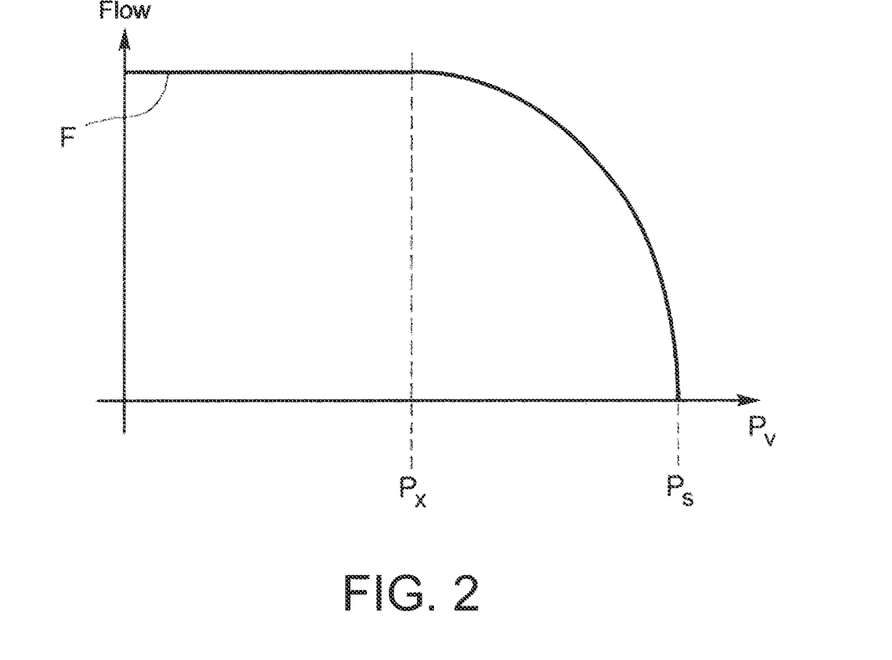
FIG. 2 illustrates the trend of a flow curve through a nozzle.

It is known from fluid dynamics that the flow rate curve for filling a volume through a nozzle has a characteristic as shown qualitatively in FIG. 2. Assuming that the source 102 is large enough to allow one to consider the supply pressure value Ps constant when filling the volume 101, for instantaneous pressure values Pv inside the volume 101 that are lower than a value wherein the flow rate passes from sonic (constant flow) to subsonic, indicated at Px in FIG. 2, the air velocity through the orifice has a constant sonic velocity, the gas flow value in the equivalent orifice represented by the electropneumatic valve 103 has therefore a constant trend F; when the instantaneous pressure value Pv exceeds the value Px, the flow curve assumes a curvilinear shape that goes from the value F to the null value for Pv=Ps. It is known from the fluid dynamics of the orifices that Px=0.528·Ps.

Figure 3:
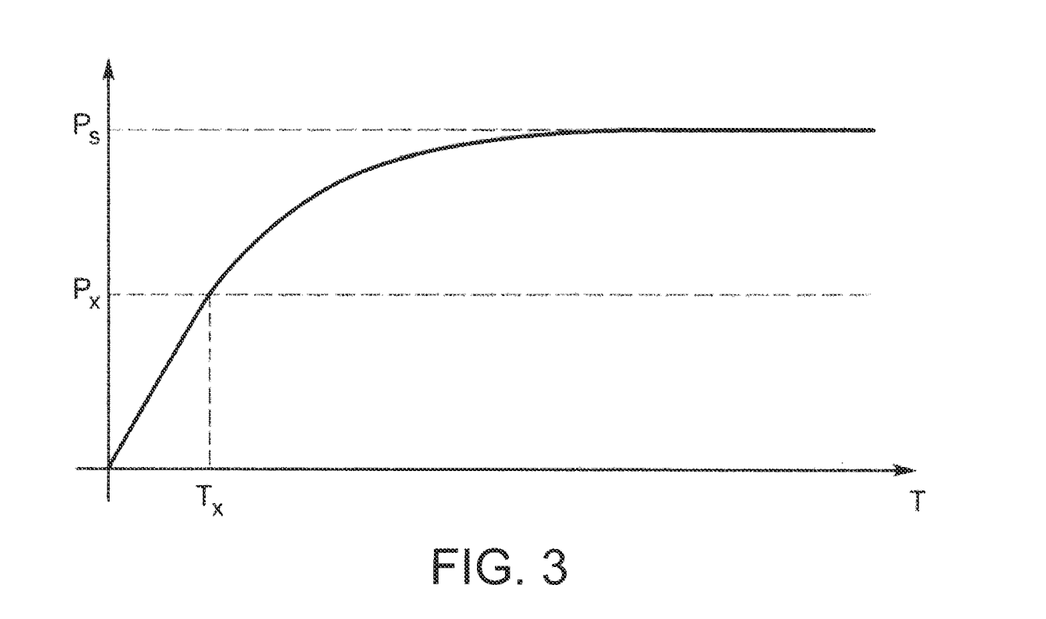
FIG. 3 illustrates the trend of a pressure curve of instantaneous pressure within the volume as a function of the time, during a filling phase.

Drawing the corresponding trend curve of the instantaneous pressure Pv(t) as a function of the time t during the filling phase, what is shown qualitatively in FIG. 3 will be obtained. For values of Ps<Px the trend of Pv(t) presents a rectilinear trend, since in this pressure range the flow rate is constant; for values of Ps>Px the trend of Pv(t) tends asymptotically to the straight horizontal line Pv=Ps.

Figure 4:
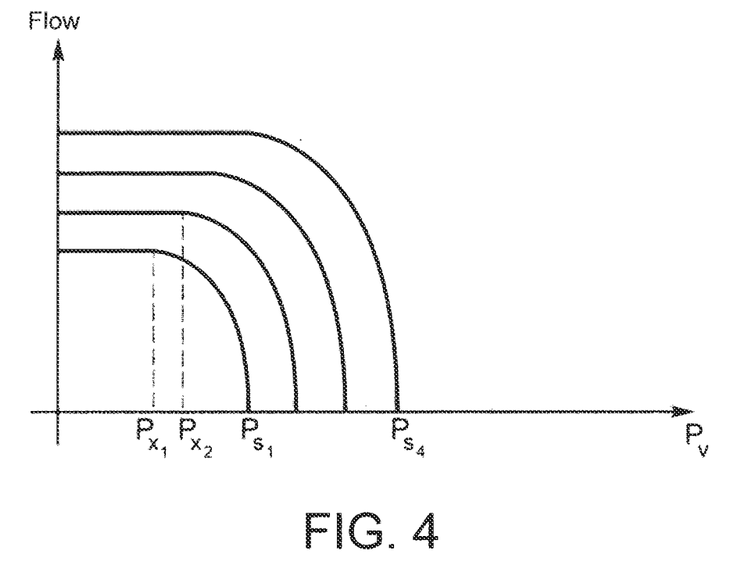
FIG. 4 illustrates the trend of a plurality of flow curves as a function of the supply pressure Ps.
Figure 5:
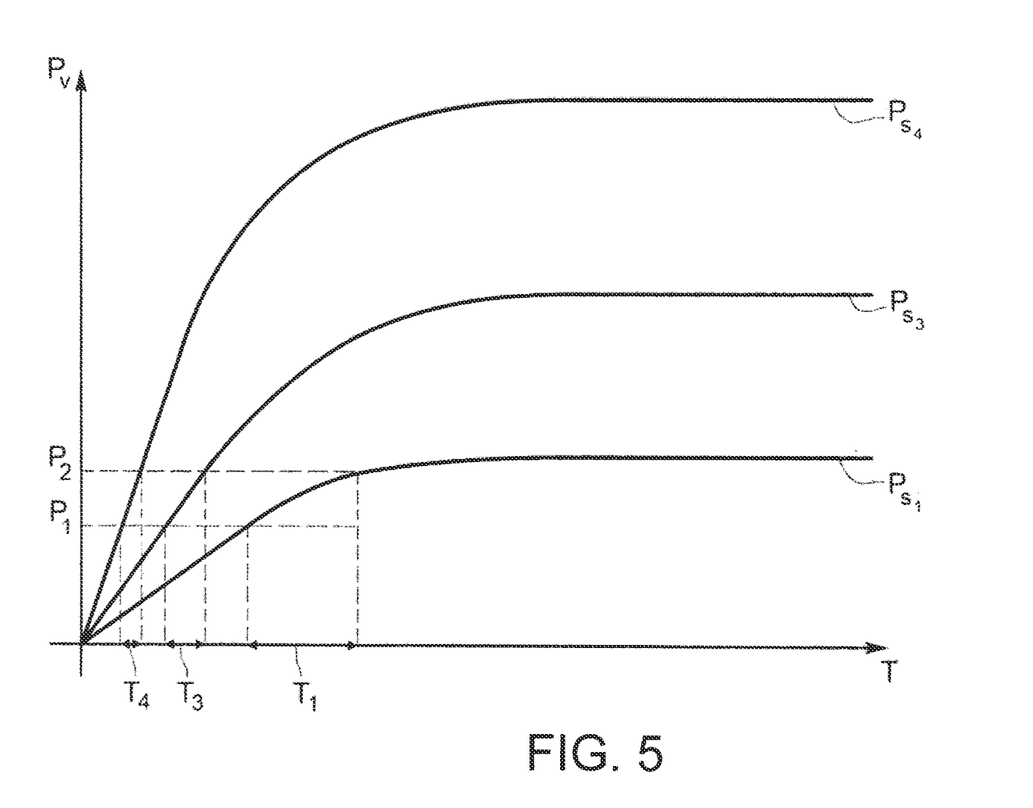
FIG. 5 illustrates a plurality of instantaneous pressure curves within the volume, derived from the plurality of flow curves in FIG. 4.

Several flow curves as a function of the instantaneous pressure F (Pv) exist as Ps varies, as illustrated in FIG. 4, to which correspond several Pv(t) curves as illustrated in FIG. 5. In particular, it is known that there is a direct proportionality, except for a negligible constant, between the various curves as the supply pressure Ps varies.

In FIG. 5 it is possible to observe how the times to pass from Pv(t)=P1 to Pv(t)=P2 are significantly different as Ps varies, i.e. T1>T3>T4.

The behavior of the pressure Pv(t) when emptying the volume 101 differs from the behavior when filling the volume 101. It is known from fluid dynamics that to illustrate the behavior of Pv(t) in the case of an emptying of the volume 101 to the atmosphere, starting from an initial pressure Pv, through the electropneumatic discharge valve 104, it is sufficient to approximate Pv(t) by means of an exponential curve $PV(t)=PVi \cdot e^{-t/\tau}$, with $\tau$ time constant characteristic of the system.

Disadvantageously, on the basis of what has been described so far, it is deduced that the system may be described as asymmetrical and strongly non-linear.

Figure 6:
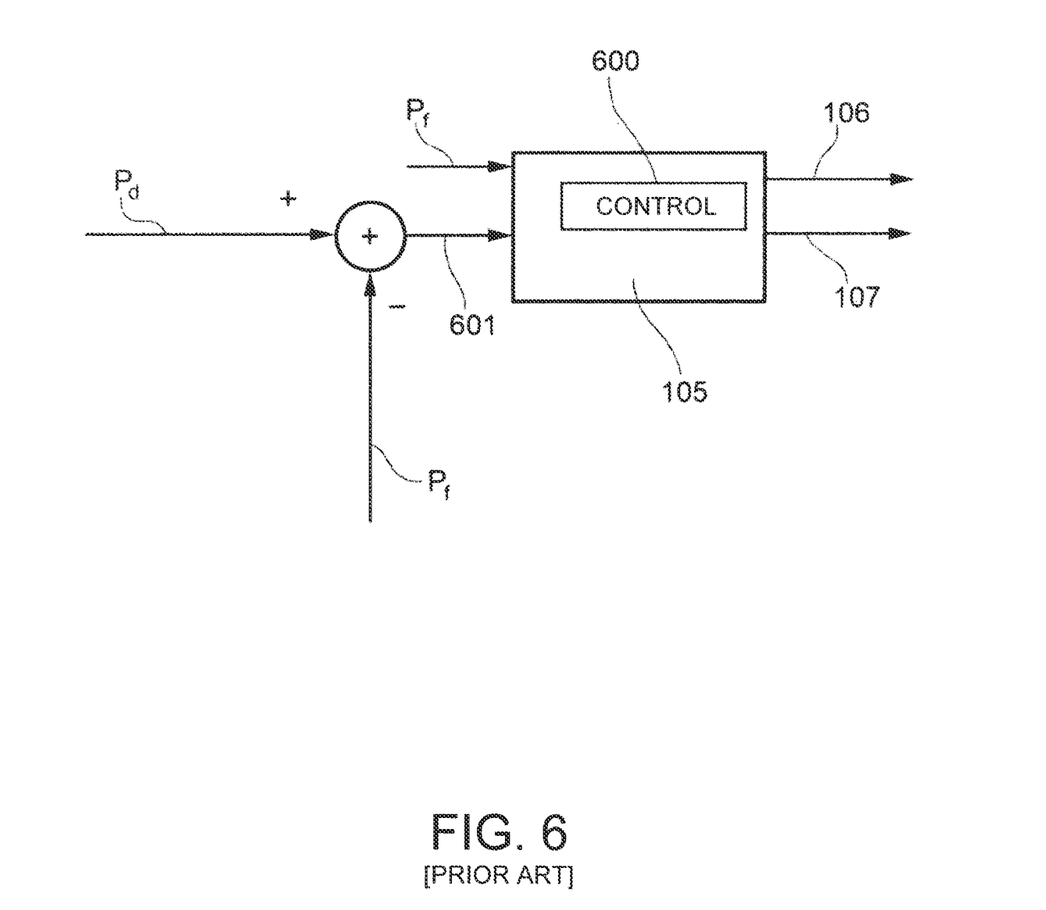
FIG. 6 illustrates a second control system of a pneumatic pressure within a volume made according to the known art.

Control systems as shown in FIG. 1 and FIG. 6 are usually used to regulate the pressure in the volume 101. An electronic unit 105 receives a pressure request Pd and the feedback value Pf corresponding to the instantaneous pressure value Pv, read by a pressure transducer 108. A control algorithm 600, receives the error 601 between the pressure request signal Pd and the feedback value Pf, and controls the electropneumatic charge and discharge valves 103, 104 by means of control signals 106, 107, with the aim to make the error 601 null.

Said control algorithm may take different forms, the most known and used being the bang-bang (on-off with hysteresis) control, or PID (Proportional Integrative Derivative) control, or Fuzzy Logic.

That which is noted below, in relation to the behavior of the aforesaid algorithms, is known to those skilled in the art of closed loop regulation process control.

The bang-bang control has the advantage of being extremely simple to implement, but absolutely unstable when the volume 101 is small, e.g. size of the pilot chamber of a relay valve. In this case the filling and emptying times of the volume are extremely short, just one order of magnitude greater than the excitation and shutdown times of the electropneumatic charge and discharge valves 103, 104. In this case, it is known to those skilled in the art that in order to achieve stability, a very wide tolerance band must be used, such as to absorb the error introduced by the delay in implementation of said electropneumatic charge and discharge valves 103, 104. A very wide hysteresis band results in poor system accuracy.

The PID control is very effective when controlling actuators with very linear characteristics. In the case shown in FIG. 1, it is necessary to compensate for the strong nonlinearities by means of a very high sampling frequency and PWM excitation/de-excitation of the solenoid valves, such that said valves wear out in a very short time to the detriment of the maintenance costs of the system.

The control based on Fuzzy Logic may represent a partial improvement with respect to bang-bang and PID controls, because due to its operating mode it may take into account, as input variable, the supply pressure value Ps and then vary its parameters according to the variation of said Ps by carrying out a partial linearization of the system. However, the Fuzzy Logic control requires extensive parameterization and very complex tuning.

Patent application WO2018007187, claims a control method for an electropneumatic system as described in FIG. 1. Said method is based on the storage of a reference system, by means of a curve or a table containing normalized information on the excitation times to be attributed to electropneumatic charge and discharge valves 103, 104. Through further operations to be carried out in real time on said normalized information on the excitation times, said operations being based on further parameters dependent on the fluid dynamic characteristics of the actual system and on some factors related to the current state of the system, such as the current PVi and PVs pressures, the effective excitation times to be attributed to the electropneumatic charge and discharge valves 103, 104 are obtained.

SUMMARY OF THE INVENTION

One object of the present invention is therefore to create a method and a control system that adapt to the physical and fluid-dynamic magnitudes of the actual system under control, which continuously compensate the behavioral variations of the single components belonging to such system under control, as a function of variations in temperature, wear and aging, while maintaining the required accuracy. Further objects concern minimizing the number of electropneumatic valve excitations in any system condition and the status of the components of the system under control, while maintaining unchanged the control accuracy, and the possibility of carrying out an overall diagnosis of the controlled system, avoiding the need for a detailed diagnostic control on each individual system component.

To obtain this result, the present patent discloses a method and a system for controlling the pneumatic pressure in a volume by actuating at least one electropneumatic charge valve and one electropneumatic discharge valve.

The method of the present invention bases its operation on a control of the electropneumatic charge and discharge valves 103, 104 which occurs by applying opening times previously stored in a matrix, the input variables of which depend on the current pressure characteristic of the system under the control of the method.

In particular, the procedure differs from, and improves on, what is disclosed in WO2018007187, by further correcting the matrix content in real time on the basis of the error calculated as the difference between a pressure expected within the volume and a pressure actually obtained within the volume, thus tending to cancel the error between the expected pressure and the pressure obtained in subsequent cycles. Furthermore, it is possible to carry out a diagnosis of the overall system under the control of the method in real time, observing the deviation of the content of the matrix during its evolution, comparing it in real time or at predetermined periods with the matrix in its initial state.

The aforesaid and other objects and advantages are achieved, according to one aspect of the invention, by a method for controlling the pneumatic pressure in a volume by the actuation of at least one electropneumatic charge valve and one electropneumatic discharge valve having the characteristics defined in claim 1 and by a system for controlling the pneumatic pressure in a volume by the actuation of at least one electropneumatic charge valve and at least one electropneumatic discharge valve. Preferred embodiments of the invention are defined in the dependent claims, the content of which is intended as an integral part of the present description.

BRIEF DESCRIPTION OF THE DRAWINGS

The functional and structural characteristics of some preferred embodiments of a method and system for controlling the pneumatic pressure in a volume by actuating at least one electropneumatic charge valve and one electropneumatic discharge valve according to the invention will now be described. Reference is made to the accompanying drawings, wherein:

FIG. 9 illustrates an example of a two-dimensional matrix.

DETAILED DESCRIPTION

Before explaining in detail a plurality of embodiments of the invention, it should be clarified that the invention is not limited in its application to the constructive details and to the configuration of the components presented in the following description or illustrated in the drawings. The invention may assume other embodiments and may in practice be implemented or achieved in different ways. It should also be understood that the phraseology and terminology have descriptive purposes and should not be construed as restrictive. The use of "include" and "comprise" and the variations thereof are to be understood as encompassing the elements stated hereinafter and the equivalents thereof, as well as additional elements and the equivalents thereof.

The following detailed description of the invention will refer, without limitation, to the case illustrated in FIG. 1. That is, in the case wherein the electropneumatic valves are normally closed solenoid valves. Obviously even normally open electropneumatic valves and vice versa may be used.

In a first embodiment, the method for controlling the pneumatic pressure in a volume 101 by actuating at least one electropneumatic charge valve 103 and an electropneumatic discharge valve 104 provided to vary the pressure inside said volume 101, comprises the following step:
  a) providing at least one matrix 900, wherein each cell of the matrix 900 is provided to indicate an expected opening time of the at least one electropneumatic charge valve 103 or an expected opening time of the at least one electropneumatic discharge valve 104, as a function of at least an initial pressure value PVi inside the volume 101 and a target pressure value PVt to be reached inside the volume 101.

Moreover, if the effective initial pressure value PVi within the volume 101 is less than the target pressure value PVt to be reached within the volume 101, i.e. it is desired to increase the pressure within the volume 101 relative to the initial pressure, the method comprises the steps of:
  b) opening the at least one electropneumatic charge valve 103 for the expected opening time indicated in a cell of the matrix, the cell being selected at least as a function of the effective initial pressure value PVi inside the volume 101 and a desired target pressure value PVt;
  c) after the expected opening time indicated in the selected cell of the matrix has elapsed, measuring the pressure value reached inside the volume 101;
  d) comparing the measured pressure value reached inside the volume 101 with the desired target pressure value PVt;
  e) decreasing the value of the opening time indicated in the selected cell of the matrix, if the measured pressure value reached inside the volume 101 exceeds the target pressure value PVt desired by at least a predetermined tolerance value;
  f) increasing the value of the opening time indicated in the selected cell of the matrix, if the measured pressure value reached inside the volume 101 is lower than the desired target pressure value PVt by at least the predetermined tolerance value.

If, on the other hand, the effective initial pressure value PVi within the volume 101 is greater than the target pressure value PVt to be reached within the volume 101, i.e. it is desired to reduce the pressure within the volume 101 relative to the initial pressure, the method comprises the steps of:
  b') opening the at least one electropneumatic discharge valve 104 for the expected opening time indicated in a cell of the matrix, the cell being selected as a function of at least the effective initial pressure value PVi inside the volume 101 and a desired target pressure value PVt;
  c') after the expected opening time indicated in the selected cell of the matrix has elapsed, measuring the pressure value reached inside the volume 101; d') comparing the measured pressure value reached inside the volume 101 with the desired target pressure value PVt;
  e') increasing the value of the opening time indicated in the selected cell of the matrix, if the measured pressure value reached inside the volume 101 exceeds the desired target pressure value PVt by at least the predetermined tolerance value;
  f) decreasing the value of the opening time indicated in the selected cell of the matrix, if the measured pressure value reached within the volume 101 is lower than the desired target pressure value PVt by at least the predetermined tolerance value.

By applying this method, the opening time values are continuously corrected to continuously improve the accuracy of achieving the target pressure PVt within the volume 101 within a predetermined tolerance band, defined by the predetermined tolerance value, with a single excitation command.

When required in the various steps, the pressure within the volume 101 may for example be measured using a pressure transducer 108, as shown in FIG. 1.

Making a numerical example, considering a predetermined tolerance value equal to 0.2 bar, an initial pressure Pvi=1 and a target pressure Pvt=5, if after the electropneumatic charge valve 103 is open for the time indicated in the selected cell of the matrix, if the pressure within the volume is between 4.8 bar and 5.2 bar, it will not be necessary to increase or decrease the time indicated in the matrix cell, if the pressure within the volume is less than 4.8 bar, it will be necessary to increase the time indicated in the cell of the matrix, and if the pressure within the volume is greater than 5.2 bar, it will be necessary to decrease the time indicated in the cell of the matrix.

Making a second numerical example, considering a predetermined tolerance value equal to 0.2 bar, an initial pressure Pvi=5 and a target pressure Pvt=1, if after opening the electropneumatic discharge valve 104 for the time indicated in the selected cell of the matrix, if the pressure within the volume is between 0.8 bar and 1.2 bar, it will not be necessary to increase or decrease the time indicated in the cell of the matrix, if the pressure within the volume is less than 0.8 bar, it will be necessary to decrease the time indicated in the cell of the matrix, and if the pressure within the volume is greater than 1.2 bar, it will be necessary to increase the time indicated in the cell of the matrix.

Figure 7:
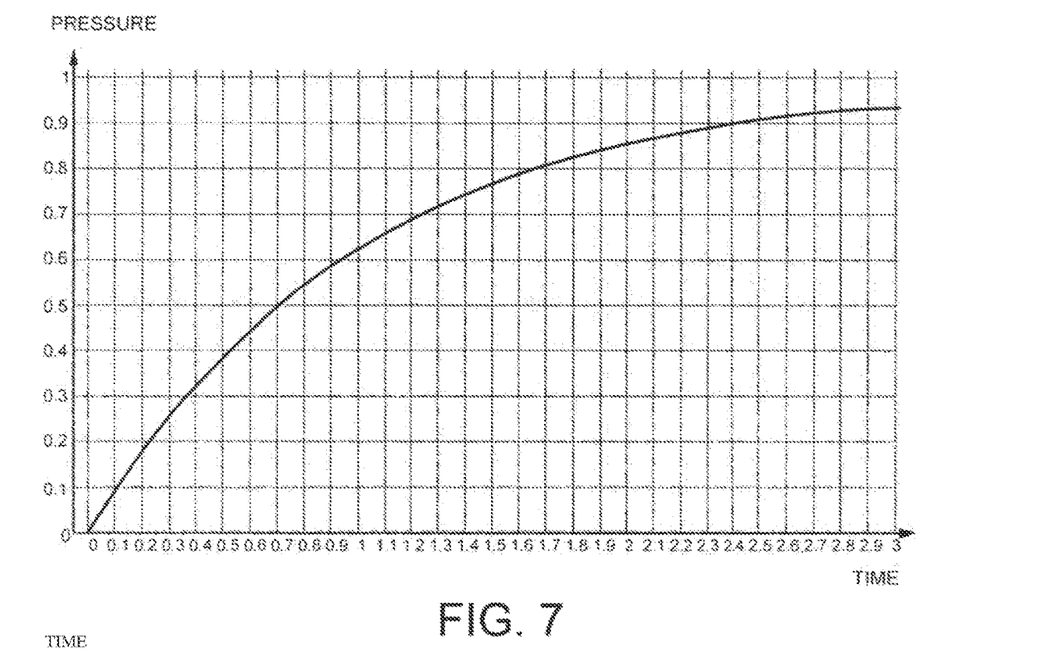
FIG. 7 illustrates an exponential curve that approximates the curve represented in FIG. 3.
Figure 8:
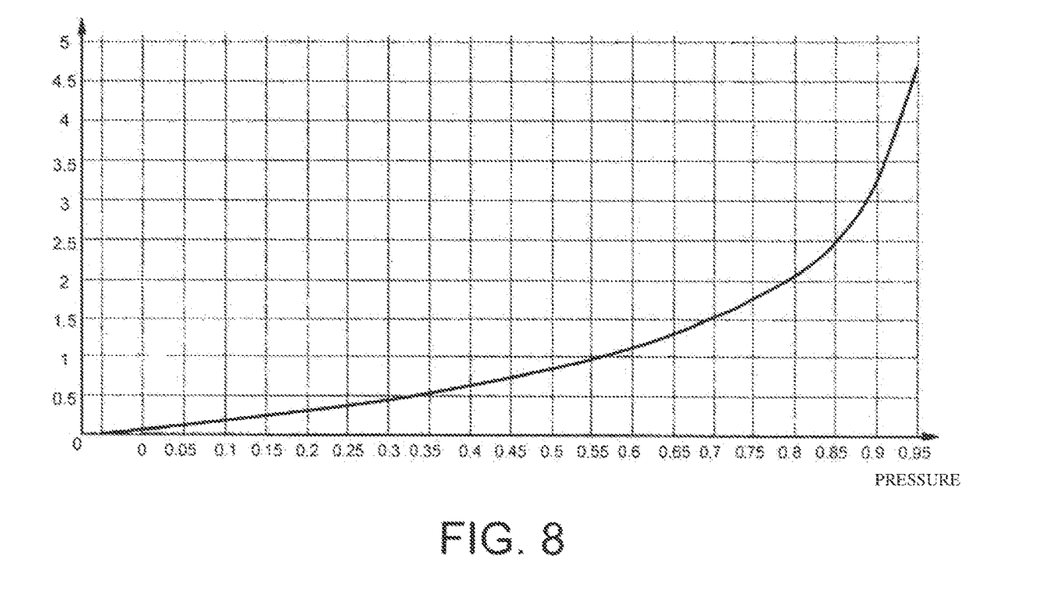
FIG. 8 illustrates the inverse curve of the curve of FIG. 7.

The following also describes a possible way of filling the matrix. For graphical and explanatory purposes only, it may be observed that FIG. 7 approximates with an exponential curve the curve represented in FIG. 3. In FIG. 7, for example, Ps=1 bar. From the Pv(t) values it is possible to obtain the inverse curve t (Pv) represented in FIG. 8. From the curve illustrated in FIG. 8 it is therefore possible to obtain the opening values for the electropneumatic charge valve 103, necessary to bring the pressure in the volume 101 from any initial value PVi to any target value PVt greater than Pvi. The opening time being obtained by the difference between the time corresponding to the target value PVt and the time corresponding to the initial value PVi. Clearly, the same method may be applied in a similar way to the electropneumatic discharge valve 104, in order to obtain the opening values for the electropneumatic discharge valve 104 necessary to bring the pressure in the volume 101 from any initial value PVi to any target value PVt lower than the Pvi.

Calculating the opening times of an electropneumatic valve with the method previously described, for different initial pressures PVi and for different target pressures PVt, it is possible to obtain the two-dimensional matrix illustrated by way of example in FIG. 9. On the abscissa the initial pressure values PVi are provided and on the ordinate, the target pressure values PVt. At the point of intersection is the opening time to be assigned to the charge valve 103 or to the discharge pressure 104 to go from the initial pressure PVi to the target pressure PVt selected. By way of example, the resolution of the two-dimensional matrix illustrated in FIG. 9 corresponds to 0.05 bar.

Observing the matrix in FIG. 9, it may be seen that said matrix is null at the coordinates PVi=PVt and PVi>PVt. This observation makes it possible to integrate the matrices relating to the opening times of the charge valve 103 for filling and the opening times of the discharge valve 104 for emptying into a single matrix. The diagonal corresponding to the coordinates PVi=PVt will remain null and will be the separation element between the two cases.

In alternative solutions, two separate matrices may be created, a first matrix to be consulted in the case of PVi>PVt and the other in the case wherein PVi<PVt.

The matrix may also be three-dimensional, and each cell of the matrix 900 may be arranged to indicate an expected opening time of the at least one electropneumatic charge valve 103 or of the at least one electropneumatic discharge valve 104 as a function of an initial pressure value PVi, a target pressure value PVt and a supply pressure value Ps. The three-dimensional matrix is indicated if the supply pressure Ps may also vary during the operation. The three-dimensional matrix will therefore have three dimensions, PVi, PVt and Ps. In this case, the cell of the matrix may be selected as a function of the effective initial pressure value PVi inside the volume 101, the desired target pressure value PVt and the supply pressure value Ps.

Or, the matrix 900 may also be two-dimensional and each cell of the matrix 900 may be arranged to indicate an expected opening time of the at least one electropneumatic charge valve 103 or of the at least one electropneumatic discharge valve 104 as a function of the ratio between the initial pressure value PVi, and the supply pressure value Ps, and a target pressure value PVt. In this case, the cell of the matrix may be selected as a function of the ratio between the effective initial pressure value PVi inside the volume 101 and the supply pressure value Ps, and the desired target pressure value PVt.

In a further possibility, the matrix 900 may be two-dimensional and each cell of the matrix 900 may be arranged to indicate an expected opening time of the at least one electropneumatic charge valve 103 or of the at least one electropneumatic discharge valve 104 as a function of the ratio between the initial pressure value PVi, and the supply pressure value Ps, and the difference between the target pressure value PVt and the initial pressure value PVi. In this case, the cell of the matrix may be selected as a function of the ratio between the effective initial pressure value PVi inside the volume 101 and the supply pressure value Ps, and the difference between the desired target pressure value PVt and the effective initial pressure value PVi inside the volume 101.

When selecting a cell from the matrix at least as a function of the initial pressure Pvi and of the target pressure Pvt, it may be necessary to consider rounding off the initial pressure Pvi and the target pressure Pvt. For example, if one must find the opening time to go from a PVi=0.32 bar to PVt=0.69 bar, the selected cell may correspond to the function cell of PVi=0.3 bar and PVt=0.7 bar, i.e., the cell 901 containing the value 0.85 s. The tolerance band with which the value reached is validated must make the error introduced by the rounding action of Pvi and Pvt negligible. For this purpose, the acceptance band may correspond to at least +/−one discretization step of the coordinate, in the case of the example +/−0.05 bar.

It is known to those skilled in the art that in the case of microprocessor control systems, these regulate the systems to be controlled at a fixed frequency, called the sampling frequency: in this case, if the opening time of the electropneumatic valve taken from the two-dimensional matrix is longer than the sampling period, at each sampling period within the opening time the electronic unit may if necessary update the opening time, taking a new value from the two-dimensional matrix using as initial pressure the current value of feedback pressure Pf at the time of sampling. In this way the unit may correct in real time possible deviations between the theoretical behavior of the system described by the two-dimensional matrix and the real behavior of the system under control.

Returning to the method for controlling the pneumatic pressure in a volume 101 by actuating at least one electropneumatic charge valve 103 and one electropneumatic discharge valve 104 provided to vary the pressure within said volume 101, steps b, c, d, e, and f, and steps b', c', d', e', f' may be repeated until the measured pressure value reached within the volume 101 falls within a predetermined tolerance range defined by the desired target pressure PVt±the tolerance value.

In other words, if the initial pressure value PVi within the volume 101 is less than the target pressure value PVt to be reached within the volume 101, the previously described steps b, c, d, e, f, may be repeated until the measured pressure value reached within the volume 101 exceeds the target pressure value PVt by at least the predetermined tolerance value or as long as the measured pressure value reached within the volume 101 is less than the target pressure value PVt by at least the predetermined tolerance value. This repetition is necessary in the case wherein, through a single opening of the charge valve 103, it has not been possible to obtain a measured pressure value reached within the volume 101 that exceeds the target pressure value PVt by at least the predetermined tolerance value or it has not been possible to obtain a measured pressure value reached within the volume 101 that is below the target pressure value PVt by at least the predetermined tolerance value.

On the other hand, if the initial pressure value PVi within the volume 101 is higher than the target pressure value PVt to be reached within the volume 101, the steps b', c', d', e', f', may be repeated until the measured pressure value reached within the volume 101 is less than the target pressure value PVt by at least the predetermined tolerance value or as long as the measured pressure value reached within the volume 101 is greater than the target pressure value PVt by at least the predetermined tolerance value. This repetition is necessary in the case wherein, through a single opening of the discharge valve 104, it has not been possible to obtain a measured pressure value reached within the volume 101 less than the target pressure value PVt by at least the predetermined tolerance value or it has not been possible to obtain a measured pressure value reached within the volume 101 greater than the target pressure value PVt by at least the predetermined tolerance value.

In a further aspect, the step of measuring the pressure value reached inside the volume 101 may be carried out after a period of time for the stabilization of the pressure inside the volume has passed from the moment wherein the at least one electropneumatic charge valve 103 or the at least one electropneumatic discharge valve 104 has been closed, after having been open for the opening time indicated in the selected cell. The stabilization time may be provided to allow possible pressure transients within the volume 101 to settle, which may occur after the closing of the electropneumatic charge valve 103 or the electropneumatic discharge valve 104.

Clearly, the value of the opening time may be decreased in step e by a first determined value, the value of the opening time may be increased in step f by a second determined value, the value of the opening time may be increased in step e' by a third determined value and the value of opening time may be decreased in step f by a fourth determined value. The first determined value, the second determined value, the third determined value and the fourth determined value may, but not necessarily, be equal and correspond to a predetermined constant correction value which may be stored for example in a storage medium.

The first determined value, the second determined value, the third determined value and the fourth determined value may also be determined as a function of the difference between the measured pressure value reached within the volume 101 and the target pressure value PVt.

In a further aspect, if the effective initial pressure value PVi within the volume 101 is less than the target pressure value PVt to be reached within the volume 101, the method may comprise the steps of:

g) decreasing the value of the opening time indicated at least in the cells having a first degree of adjacency with the selected cell of the matrix if the measured pressure value reached inside the volume 101 exceeds the desired target pressure value PVt by at least the predetermined tolerance value;

h) increasing the value of the opening time indicated at least in the adjacent cells having a first degree of adjacency with the selected cell of the matrix, if the measured pressure value reached inside the volume 101 is lower than the desired target pressure value PVt by at least the predetermined tolerance value.

On the other hand, if the effective initial pressure value PVi within the volume 101 is greater than the target pressure value PVt to be reached within the volume 101, the method may comprise the steps of:

g') increasing the value of the opening time indicated at least in the cells having a first degree of adjacency with the selected matrix cell if the measured pressure value reached inside the volume 101 exceeds the desired target pressure value PVt by at least the predetermined tolerance value;

h') decreasing the value of the opening time indicated at least in the cells having a first degree of adjacency with the selected cell of the matrix, if the measured pressure value reached inside the volume 101 is lower than the desired target pressure value PVt by at least the predetermined tolerance value.

Moreover, in steps g, h and g', h', the values of the opening time indicated at least in the cells having a second degree of adjacency, higher than the first degree of adjacency, may also be increased or decreased. It is clear that the aforementioned concept may also be replicated for more than two degrees of adjacency.

The opening time values indicated in adjacent cells with different degrees of adjacency may be increased or decreased by the same value with which the selected cell in the matrix is decreased or increased.

Alternatively, the opening time values indicated in the adjacent cells having different degrees of adjacency may be increased or decreased by an intermediate value between the central cell value and the null value.

In a further alternative, the opening time values indicated in the adjacent cells with different degrees of adjacency may be increased or decreased by values different from each other and different from the value with which the selected cell of the matrix is decreased or increased. For example, the opening time values may be increased or decreased by a lower correction value as one ascends with the degree of adjacency of the cells.

The first degree of adjacency refers to the 8 cells that have one side or vertex in common with the selected cell 901, which are indicated in FIG. 9 with the square 902. Or higher degrees of adjacency may be intended. For example, considering a second degree of adjacency, the adjacent cells will also be the 16 cells contained within the square 902 and the square 903, and will correspond to the cells having a side or vertex bordering the cells of the matrix with first degree adjacency. This reasoning may be applied in a similar way for cells with higher degrees of adjacency.

The same concept of adjacency may also be applied in a similar way to a three dimensional matrix. In the case of a three-dimensional matrix, the adjacent cells will moreover increase or decrease on three dimensions instead of only two.

It is clear that the correction of the adjacent cells makes the overall correction process of the matrix faster. The correction value applied to adjacent cells may differ between various degrees of adjacency.

The method for controlling the pneumatic pressure in a volume 101 by actuating at least one electropneumatic charge valve 103 and one electropneumatic discharge valve 104 described in the aforesaid embodiment may be implemented, for example, via the electronic unit 105 in FIG. 1. The electronic unit 105 may typically comprise a microprocessor or other similar control elements.

In a further aspect, matrix compression solutions may be used.

In effect, moving to a real case where the operating pressures may refer to a rail braking system, ascending to a supply pressure Ps and instantaneous pressure Pv equal to 6 bar, with resolutions of 50 mbar, the two-dimensional matrix will be composed of $(6/0.05)^2=14400$ cells, while the three-dimensional matrix will be composed of $(6/0.05)^3=1728000$ cells. If the times contained in the matrix are represented dimensionally in milliseconds [ms], one byte will not be sufficient to make a cell, as it would limit the maximum time dimension that may be represented to 255 mS. Having to use two bytes per cell, a three-dimensional matrix requires 1,728,000×2=3,456,000 bytes, or about 3.5 megabytes of memory. This amount of memory is considered negligible in microprocessor control systems for railway applications. However, when, in special low-consumption applications, 8-bit microprocessors with limited built-in memory must be used, it is necessary to perform a drastic compression of the data contained in the matrix.

For this purpose, the proportionality of the flow rate through the orifice as a function of the pressure upstream of the same orifice is used, as shown graphically in FIG. 4. By making use of this property, a diagram Pv(t)/Ps will always correspond to the same curve for any supply pressure value Ps, at least within the range 2 bar<Ps<6 br which concerns railway braking applications. Therefore, using this principle, it is possible to return to using a two-dimensional matrix with an input variable corresponding to the initial normalized pressure value PVt/Ps and a second input variable corresponding to the target normalized pressure value PVt/Ps. In this case, still wanting to obtain an accuracy of 50 mbar in reaching the PVt, for a supply pressure scale Ps=6 bar, a matrix consisting of $(6/0.05)^2=14400$ cells will again be obtained.

One method to obtain a further reduced two-dimensional matrix consists in considering the opening time as the sum of two control strategies:

In a first step, an electronic control unit 105 energizes the electropneumatic charge valve 103 and at each sampling period measures the pressure value Pva reached in the volume.

When the value ΔP=(PVt−PVa) is lower than a predetermined value ΔPmax, the electronic control unit 105 takes the time from a two-dimensional matrix with an axis bearing the initial normalized pressure value PVi/Ps and an axis bearing the value ΔP=(PVt−PVa). The time taken is applied as the opening extension time to the electropneumatic charge valve 103.

The same may be done analogously for the electropneumatic discharge valve 104.

Using the reduction method just described, while still wanting to obtain an accuracy of 50 mbar in reaching Pv(t), for a supply pressure Ps=6 bar, and applying for example a value ΔPmax=1 bar, a matrix consisting of (6/0.05)−(1/0.05) =2400 cells will be obtained.

The present invention further concerns a pneumatic pressure control system in a volume 101 by actuation of at least one electropneumatic charge valve 103 and at least one electropneumatic discharge valve 104 provided to vary the pressure within said volume 101; the pneumatic pressure control system in a volume 101 being configured to carry out a method according to any of the preceding claims and further comprising a non-volatile storage medium wherein the predefined matrix 900 is stored, and a volatile storage medium wherein the matrix 900 stored in the non-volatile storage medium is copied when the control system is started. The matrix copied into the volatile storage medium is updated when a modification is made to any cell of the matrix.

The matrix stored in the non-volatile storage medium may be compared with the updated matrix stored in the volatile storage medium of the control system. If a cell of the matrix stored in the non-volatile storage medium is different from the corresponding cell of the updated matrix stored in the volatile storage medium of the control system by at least a predetermined threshold of congruence, the system may be arranged to generate a warning signal.

This system may thus adapt a two-dimensional theoretical control matrix to the individual characteristics of a specific unit, once the system is started. In the same way, the system may dynamically and in real time adapt the matrix to changes in the real time behavior of the system components, for example to changes in operating temperature during daily operation.

In an example embodiment, the matrix is initially loaded into a non-volatile memory area of a microprocessor system 105. When turned on, the microprocessor system 105 copies the contents of the matrix into an area of the volatile memory of said microprocessor system 105 so that its contents may be modified in real time according to the correction procedure described previously. At a predetermined rate, the microprocessor system 105 performs a comparison of the values contained in the matrix present in non-volatile memory, used as a reference matrix, and the values contained in the matrix in volatile memory subject to adaptive correction. If the corresponding cell values differ by more than a fixed threshold, such as to take into account permissible adaptive changes, then a diagnostic indication of impermissible drift of the system, indicative of malfunction or drift of the characteristics of a sub-component, is detected and released by the microprocessor system 105 as diagnostic information.

The advantages of the present invention therefore are the possibility to create a method and a control system that adapt to the physical and fluid-dynamic magnitudes of the actual system under control, which continuously compensate the behavioral variations of the single components belonging to the system under control, as a function of variations in temperature, wear and aging, while maintaining the required accuracy. Further advantages concern minimizing the number of electropneumatic valve excitations in any system condition and the status of the system components under control, while maintaining unchanged the control accuracy, and the possibility to perform an overall diagnosis of the controlled system, avoiding the need for a detailed diagnostic check on each individual component of the system.

Various aspects and embodiments of a method and system for controlling the pneumatic pressure in a volume by actuating at least one electropneumatic charge valve and one electropneumatic discharge valve according to the invention have been described. It is understood that each embodiment may be combined with any other embodiment. The invention, moreover, is not limited to the described embodiments, but may be varied within the scope defined by the accompanying claims.

The invention claimed is:

1. A method for controlling a pressure in a volume, comprising the following steps:
   a) providing a matrix, wherein cells of the matrix indicate values of expected opening times as a function of an initial pressure value (PVi) inside the volume and a target pressure value (PVt) to be reached inside the volume, wherein the expected opening times are associated with actuations of at least one of an electropneumatic charge valve or an electropneumatic discharge valve arranged to vary the pressure in the volume;
   if an effective initial pressure value (PVi) inside the volume is lower than the target pressure value (PVt) to be reached inside the volume:
   b) opening the electropneumatic charge valve for the expected opening time indicated in a first cell of the matrix, the first cell being selected at least as a function of the effective initial pressure value (PVi) inside the volume and a desired target pressure value (PVt);
   c) measuring the pressure reached inside the volume after the expected opening time indicated in the first cell of the matrix has elapsed;
   d) comparing a measured pressure value reached inside the volume after the expected opening time indicated in the first cell of the matrix has elapsed with the desired target pressure value (PVt);
   e) decreasing the value of the expected opening time indicated in the first cell of the matrix if the measured pressure value reached inside the volume exceeds the desired target pressure value (PVt) by at least a predetermined tolerance value;

f) increasing the value of the expected opening time indicated in the first cell of the matrix, if the measured pressure value reached inside the volume is lower than the desired target pressure value (PVt) by at least the predetermined tolerance value;

if the effective initial pressure value (PVi) inside the volume is higher than the target pressure value (PVt) to be reached inside the volume:

b') opening the electropneumatic discharge valve for the expected opening time indicated in a second cell of the matrix, the second cell being selected as a function of at least the effective initial pressure value (PVi) inside the volume and a second desired target pressure value (PVt);

c') measuring the pressure reached inside the volume after the expected opening time indicated in the second cell of the matrix has elapsed;

d') comparing a measured pressure value reached inside the volume after the expected opening time indicated in the second cell of the matrix has elapsed with the second desired target pressure value (PVt);

e') increasing the value of the expected opening time indicated in the second cell of the matrix, if the measured pressure value reached inside the volume exceeds the second desired target pressure value (PVt) by at least the predetermined tolerance value;

f') decreasing the value of the expected opening time indicated in the second cell of the matrix, if the measured pressure value reached within the volume is lower than the second desired target pressure value (PVt) by at least the predetermined tolerance value.

2. A method according to claim 1, wherein steps b, c, d, e, f, and steps b', c', d', e', f' are repeated until the measured pressure value reached inside the volume falls within a predetermined tolerance band defined by the desired target pressure value (PVt)±the predetermined tolerance value.

3. The method according to claim 1, wherein the step of measuring the pressure reached inside the volume is carried out after a period of time for a stabilization of the pressure inside the volume has passed from a moment wherein the at least one of the electropneumatic charge valve or the electropneumatic discharge valve has been closed, after having been opened for the expected opening time indicated in the respective first cell or second cell.

4. The method according to claim 1, wherein the matrix is three-dimensional and each cell of the matrix is arranged to indicate the expected opening time of the at least one of the electropneumatic charge valve or the electropneumatic discharge valve as a function of the initial pressure value (PVi), the target pressure value (PVt) and a supply pressure value (Ps);

the cell of the matrix being selected as a function of the effective initial pressure value (PVi) inside the volume, the desired target pressure value (PVt) and the supply pressure value (Ps).

5. The method according to claim 1, wherein the matrix is two-dimensional and each cell of the matrix is arranged to indicate the expected opening time of the at least one of the electropneumatic charge valve or the electropneumatic discharge valve as a function of a ratio between the initial pressure valve (PVi) and a supply pressure value (Ps), and the target pressure value (PVt);

the cell of the matrix being selected as a function of a ratio between the effective initial pressure value (PVi) inside the volume and the supply pressure value (Ps), and the desired target pressure value (PVt).

6. The method according to claim 1, wherein the matrix is two-dimensional and each cell of the matrix is arranged to indicate an expected opening time of at least one of the electropneumatic charge valve or the electropneumatic discharge valve as a function of a ratio between the initial pressure value (PVi) and a supply pressure value (Ps), and the difference between the target pressure value (PVt) and the initial pressure value (PVi);

the cell of the matrix being selected as a function of a ratio between the effective initial pressure value (PVi) inside the volume (101) and the supply pressure value (Ps), and the difference between the desired target pressure value (PVt) and the effective initial pressure value (PVi) inside the volume.

7. A system for controlling the pneumatic pressure in a volume by actuating at least one electropneumatic charge valve and at least one electropneumatic discharge valve arranged to vary the pressure inside said volume; the system for controlling the pressure in a volume being configured to carry out a method according to claim 1 and further comprising:

a non-volatile storage medium wherein a predefined matrix is stored;

a volatile storage medium wherein the matrix, stored in the non-volatile storage medium, is copied at the start-up of the system;

the matrix copied into the volatile storage medium being updated when a modification is made to any cell of the matrix.

8. The system according to claim 7, wherein the matrix stored in the non-volatile storage medium is compared with the updated matrix stored in the volatile storage medium of the system;

if a cell of the matrix stored in the non-volatile storage medium is different from the corresponding cell of the updated matrix stored in the volatile storage medium of the control system by at least a predetermined threshold of congruence, the system is arranged to generate a warning signal.

9. The method according to claim 1, wherein:

the value of the expected opening time is reduced in step e by a first determined value;

the value of the expected opening time is increased in step f by a second determined value;

the value of the expected opening time is increased in step e' by a third determined value;

the value of the expected opening time is reduced in step f' by a fourth determined value.

10. The method according to claim 9, wherein the first determined value, the second determined value, the third determined value and the fourth determined value correspond to a predetermined constant correction value.

11. The method according to claim 9, wherein the first determined value, the second determined value, the third determined value and the fourth determined value are determined as a function of a difference between the measured pressure value reached inside the volume and the desired target pressure value (PVt).

12. The method according claim 1, further comprising the following steps;

if the effective initial pressure value (PVi) inside the volume is lower than the target pressure value (PVt) to be reached inside the volume:

g) decreasing the value of the expected opening time indicated at least in a cell having a first degree of adjacency with the first cell of the matrix, if the measured pressure value reached inside the volume exceeds the desired target pressure value (PVt) by at least the predetermined tolerance value; or
h) increasing the value of the expected opening time indicated at least in the adjacent cell having a first degree of adjacency with the first cell of the matrix, if the measured pressure value reached inside the volume is lower than the desired target pressure value (PVt) by at least the predetermined tolerance value;

if the effective initial pressure value (PVi) inside the volume is higher than the target pressure value (PVt) to be reached inside the volume:
g') increasing the value of the expected opening time indicated at least in a cell having a first degree of adjacency with the second cell of the matrix, if the measured pressure value reached inside the volume exceeds the desired target pressure value (PVt) by at least the predetermined tolerance value;

h') decreasing the value of the expected opening time indicated at least in the cell having a first degree of adjacency with the second cell of the matrix, if the measured pressure value reached inside the volume is lower than the desired target pressure value (PVt) by at least the predetermined tolerance value.

13. The method according to claim 12, wherein in steps g, h and g', h', the value of the expected opening time indicated in a cell having a second degree of adjacency, higher than the first degree of adjacency, is also increased or decreased.

14. The method according to claim 13, wherein the values of the opening time indicated in the adjacent cells having different degrees of adjacency are increased or decreased by the same value with which the selected cell of the matrix is decreased or increased, or the values of the opening time indicated in the adjacent cells having different degrees of adjacency are increased or decreased by values different from each other and different from the value with which the selected cell of the matrix is decreased or increased.

* * * * *